(12) United States Patent
Rana et al.

(10) Patent No.: US 9,098,127 B2
(45) Date of Patent: Aug. 4, 2015

(54) ELECTRONIC DEVICE INCLUDING TOUCH-SENSITIVE DISPLAY AND METHOD OF CONTROLLING SAME

(71) Applicant: Research in Motion Limited, Waterloo (CA)

(72) Inventors: Md Mohiuddin Rana, Waterloo (CA); Wilfried Richard Alexander Danzinger, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 52 days.

(21) Appl. No.: 13/653,921

(22) Filed: Oct. 17, 2012

(65) Prior Publication Data

US 2014/0109019 A1 Apr. 17, 2014

(51) Int. Cl.
*G06F 3/033* (2013.01)

(52) U.S. Cl.
CPC ..................................... *G06F 3/033* (2013.01)

(58) Field of Classification Search
None
See application file for complete search history.

(56) References Cited

U.S. PATENT DOCUMENTS

| | | | | |
|---|---|---|---|---|
| 5,764,873 | A * | 6/1998 | Magid et al. | 715/769 |
| 6,240,430 | B1 * | 5/2001 | Deike et al. | 715/210 |
| 6,469,722 | B1 * | 10/2002 | Kinoe et al. | 715/837 |
| 6,683,631 | B2 | 1/2004 | Carroll | |
| 7,559,033 | B2 * | 7/2009 | Boss et al. | 715/769 |
| 7,877,685 | B2 * | 1/2011 | Peters | 715/272 |
| 7,954,047 | B2 * | 5/2011 | Berger et al. | 715/220 |
| 8,132,125 | B2 * | 3/2012 | Iwema et al. | 715/863 |
| 8,286,098 | B2 * | 10/2012 | Ju et al. | 715/849 |
| 8,645,872 | B2 * | 2/2014 | Maxfield et al. | 715/863 |
| 2003/0103082 | A1 * | 6/2003 | Carroll | 345/769 |
| 2004/0078757 | A1 * | 4/2004 | Golovchinsky et al. | 715/512 |
| 2004/0210833 | A1 * | 10/2004 | Lerner et al. | 715/512 |
| 2007/0022386 | A1 | 1/2007 | Boss et al. | |
| 2007/0157085 | A1 * | 7/2007 | Peters | 715/531 |
| 2009/0049375 | A1 | 2/2009 | Aughenbaugh et al. | |
| 2009/0055778 | A1 | 2/2009 | Abdelazim et al. | |
| 2009/0228842 | A1 * | 9/2009 | Westerman et al. | 715/863 |
| 2010/0090971 | A1 | 4/2010 | Choi et al. | |
| 2010/0122160 | A1 * | 5/2010 | Chirakansakcharoen et al. | 715/256 |

(Continued)

FOREIGN PATENT DOCUMENTS

| | | |
|---|---|---|
| EP | 1674976 A2 | 6/2006 |
| EP | 2461244 A1 | 6/2012 |

OTHER PUBLICATIONS

Benzel Swipe: Conflict-Free Scrolling and Multiple Selection on Moible Touch Screen Devices, Roth et al., Apr. 4-9, 2009.*

(Continued)

*Primary Examiner* — Matt Kim
*Assistant Examiner* — Mahelet Shiberou
(74) *Attorney, Agent, or Firm* — Alexander Anishchenko; Borden Ladner Gervais LLP

(57) ABSTRACT

A method includes displaying a plurality of display elements on a touch-sensitive display of an electronic device; displaying a selection tool on the touch-sensitive display; in response to detecting a first gesture, selecting a first portion of the plurality of display elements, the first portion comprising at least one display element; and in response to detecting a second gesture, moving the selection tool without selecting the display elements; and in response to detecting a third gesture, selecting a second portion of the plurality of the plurality of display elements, the second portion being non-contiguous with the first portion.

20 Claims, 9 Drawing Sheets

(56) References Cited

U.S. PATENT DOCUMENTS

| | | |
|---|---|---|
| 2010/0293460 A1 | 11/2010 | Budelli |
| 2011/0145768 A1 | 6/2011 | Leffert et al. |
| 2011/0239153 A1 | 9/2011 | Carter et al. |
| 2012/0030566 A1 | 2/2012 | Victor |
| 2013/0042199 A1* | 2/2013 | Fong et al. .................. 715/780 |
| 2013/0136380 A1* | 5/2013 | Polichroniadis ............ 382/309 |
| 2013/0232408 A1* | 9/2013 | Xu .............................. 715/256 |

OTHER PUBLICATIONS

European Patent Application No. 12188895.2, Extended European Search Report dated Apr. 25, 2013.

International Patent Application No. PCT/CA2012/050737, International Search Report dated May 22, 2013.

European Patent Application No. 12188895.2, Office Action dated Aug. 22, 2013.

European Patent Application No. 12188895.2 Office Action dated Feb. 11, 2014.

International Patent Application No. PCT/CA2012/050737, International Preliminary Report on Patentability, Chapter II of the Patent Cooperation Treaty, Dec. 18, 2014, pp. 1-3.

European Patent Application Serial No. 12188895.2, Office Action dated Sep. 9, 2014.

European Patent Application Serial No. 12188895.2, Office Action dated Mar. 9, 2015.

* cited by examiner

ELECTRONIC DEVICE INCLUDING TOUCH-SENSITIVE DISPLAY AND METHOD OF CONTROLLING SAME

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
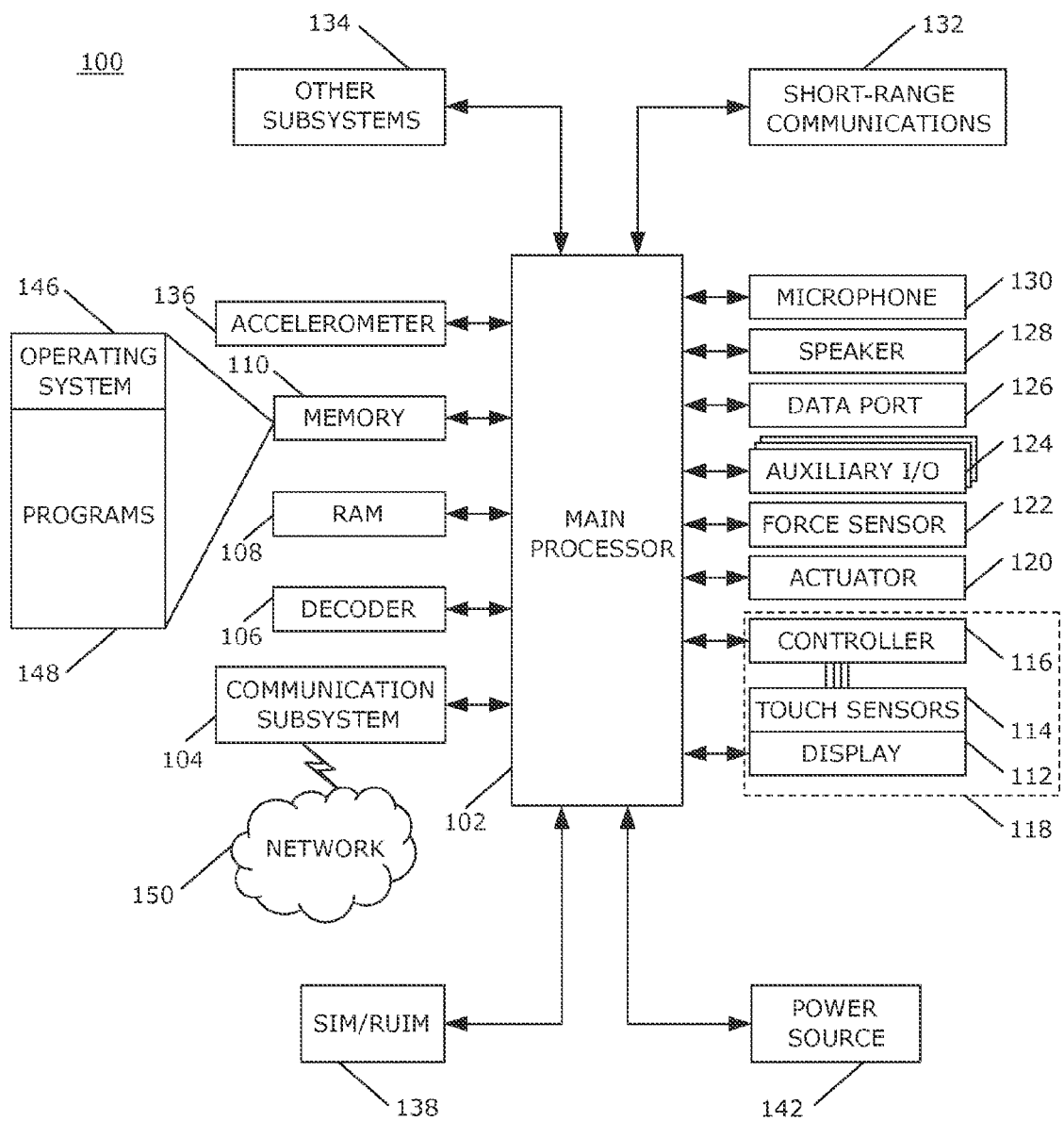
FIG. 1 is a block diagram of a portable electronic device in accordance with the disclosure.

The following describes an electronic device and a method including displaying a plurality of display elements on a touch-sensitive display of an electronic device; displaying a selection tool on the touch-sensitive display; in response to detecting a first gesture, selecting a first portion of the plurality of display elements, the first portion comprising at least one display element; and in response to detecting a second gesture, moving the selection tool without selecting the display elements; and in response to detecting a third gesture, selecting a second portion of the plurality of the plurality of display elements, the second portion being non-contiguous with the first portion.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

Known methods of copying and pasting text when using portable electronic devices can be inconvenient and time consuming. This is particularly the case when, for example, a user would like copy non-contiguous portions of text and paste them in another document or application. According to known methods the user is required to copy and paste one section of contiguous text at a time. This means that if a user would like copy several sentences that are distributed throughout several paragraphs of a document and paste them into a new document, according to known methods, the user would have to switch back and forth between the two documents several times. Switching back and forth can be inconvenient, time consuming, and disruptive to the user's thought process. In particular, the user is required to concentrate on the first section of text, select and copy a desired portion, switch to the other document, and then paste the text a desired location. The user is then further required to go back to the original document, find their place again, and repeat the process.

Various embodiments disclosed herein provide a method that allows a user to select and copy non-contiguous portions of text or other display elements and then paste them in a desired location. As used herein, the expression "non-contiguous" when referring to two or more portions of display elements, means that the two or more portions of display elements are separated by at least one display element that is not part of the two or more portions of display elements. In various embodiments, the display elements can include but are not limited to one or more text elements, one or more media elements, one or more containing elements, or any combination thereof. The display elements may be displayed as part of a document, webpage, SMS message, e-mail, or any other document or file. The term text element can refer to, but is not limited to, one or more characters, spaces, punctuation marks, symbols, words, strings of characters, phone numbers, emoticons, numbers, formulas, sentences, hyperlinks, or paragraphs. The term media element can refer to, but is not limited to, one or more graphic files, video files, or sound files or a link to one or more graphics, videos, sounds or any combination thereof. The term containing element refers to any display element that contains other display elements. For example, a containing element can include but, is not limited to, a table or an HyperText Markup Language (HTML) div element. An HTML div element can, for example, contain a text block and an image.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106.

The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
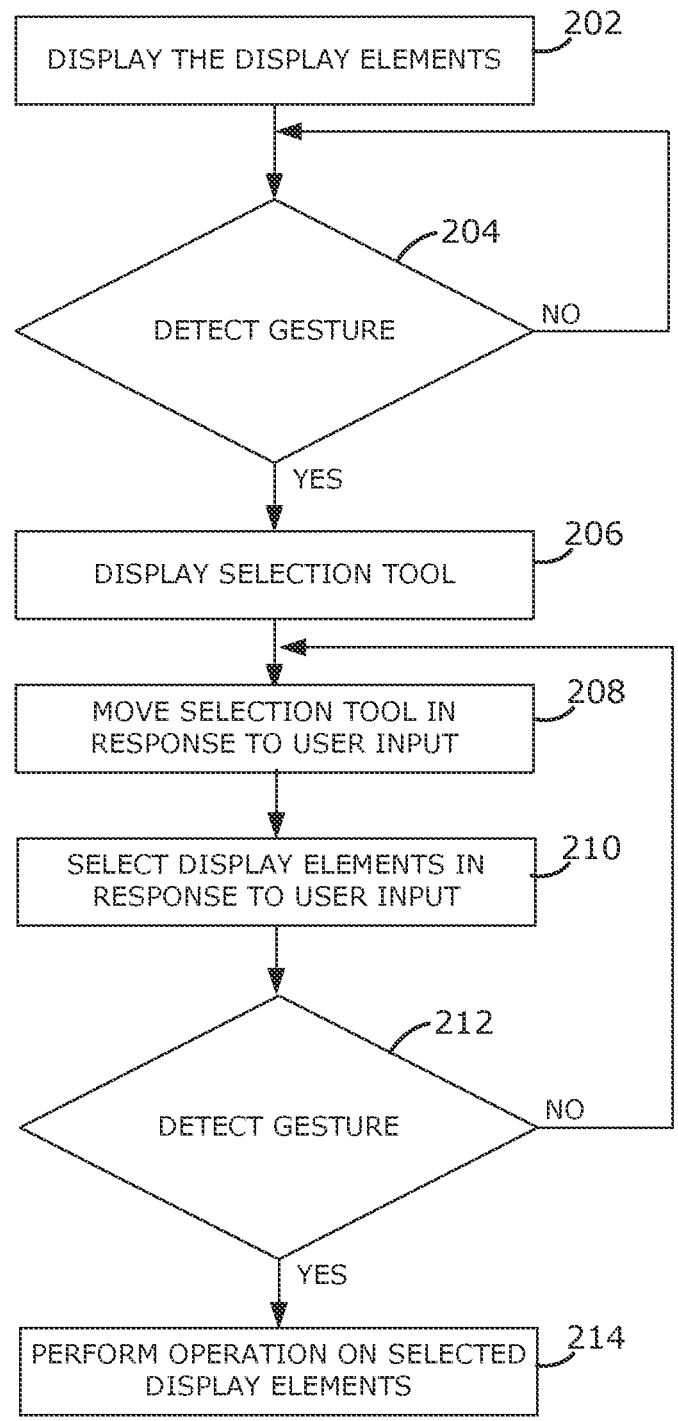
FIG. 2 is a flowchart illustrating an example of a method of display element selection on an electronic device.

A flowchart illustrating an example of a method of selecting display elements on a touch-sensitive display of an electronic device, such as the electronic device 100, is shown in FIG. 2. The method may be carried out by software executed by, for example, processor 102 and/or the controller 116. Coding of software for carrying out such a method is within the scope of a person of ordinary skill in the art given the present description. The method may contain additional or fewer processes than shown and/or described, and may be performed in a different order. Computer-readable code executable by at least one controller or processor of the portable electronic device to perform the method may be stored in a computer-readable medium, such as a non-transitory computer-readable medium.

A plurality of display elements are displayed on the touch-sensitive display 118 at 202.

At 204, it is determined whether a gesture for displaying the selection tool has been detected. In some embodiments, the gesture for displaying the selection tool is a bezel swipe. In other embodiments, gestures other than bezel swipe gesture are used for displaying the selection tool.

If the gesture has been detected at 204, then the method continues to 206. If the relevant gesture has not been detected, then 204 is repeated.

In some embodiments, at any point of the process, the user can apply a gesture to hide the selection tool. In some embodiments, the same gesture is used to hide the selection tool as to display the selection tool. In other embodiments, a different gesture is used to hide the selection tool than to display the selection tool. In various embodiments, when the selection tool is hidden, the user can apply the same gesture as at 204 to display the selection tool again.

Figure 9:
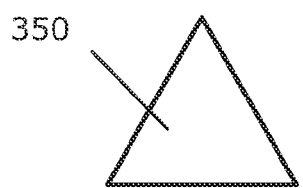
FIG. 9 is a diagram illustrating example selection tools.
Figure 9:
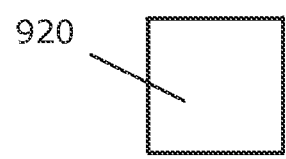
Figure 9:
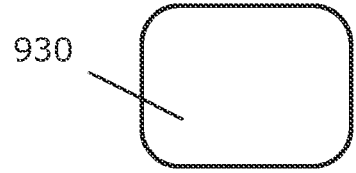
Figure 9:
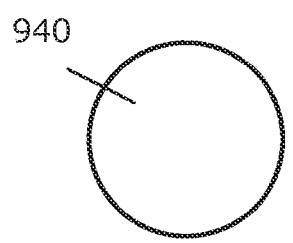
Figure 9:
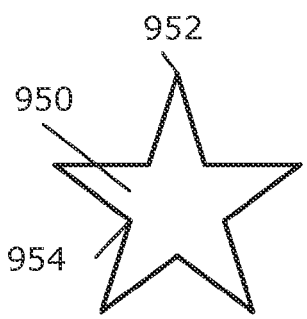
Figure 9:
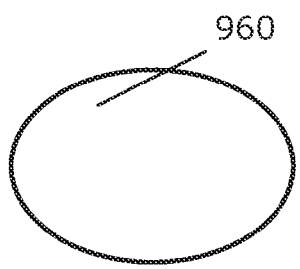
Figure 9:
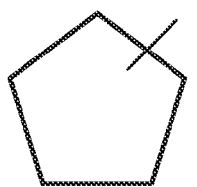
Figure 9:
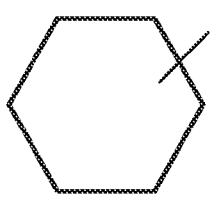
Figure 9:
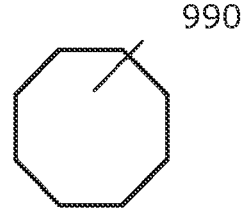

At 206, the selection tool is displayed. In some embodiments, the selection tool is displayed as a geometrical shape. Examples of selection tools are illustrated in FIG. 9 and are discussed in greater detail below.

In response to user entered commands, the selection tool is moved at 208 without selecting display elements. This allows the user to move the selection tool without selecting unwanted display elements and position it in a place convenient for selecting desired display elements.

At 210, one or more display elements are selected. In some embodiments, when display elements are selected they are highlighted. In some embodiments, the display elements that are selected at a given iteration of 210 are contiguous. However, by repeating 208 and 210, non-contiguous display elements display elements can be selected. For example, at 208, a user can move a selection tool to the start of a string of text characters in a document. Then at 210, the user can select the string of characters. At a future iteration of 208 and 210 the user can move the selection tool to a different location in the document and select another string of text characters, thereby selecting non-contiguous strings of characters.

At 212, it is determined whether a gesture is detected where the gesture is associated with an operation to be performed on the selected string of characters. Examples of operations include but are not limited to, copy, cut, paste, and delete. If the gesture has been applied, then the operation associated with the gesture is performed at 214. In some embodiments, performing the operation cancels the selection and highlighting of the selected text if applicable.

In other embodiments, even after the operation has been performed, the selection and highlighting remains active. This allows the user to continue to select additional display elements even after an operation, such as the copy function, has been performed. In other words, if a user selects and copies multiple strings of non-contiguous characters and then decides that he or she would like to copy one or more additional strings, they can select the one or more additional strings without repeating their previous selections. The user can then paste the larger selection in the same or different document or application.

In some embodiments, an operation is automatically performed on the selected display elements. For example, in some embodiments, any selected display elements are automatically copied without the user having to apply a separate gesture to copy the selected display elements. In such embodiments, after selecting display elements, the user can move to a different document or application (or different location in the same document and application) and paste the selected display elements.

If a gesture is not detected at 212, then 208 to 212 are repeated. By repeating 208 and 210, a number of non-contiguous portions of display elements can be selected.

Figure 3:
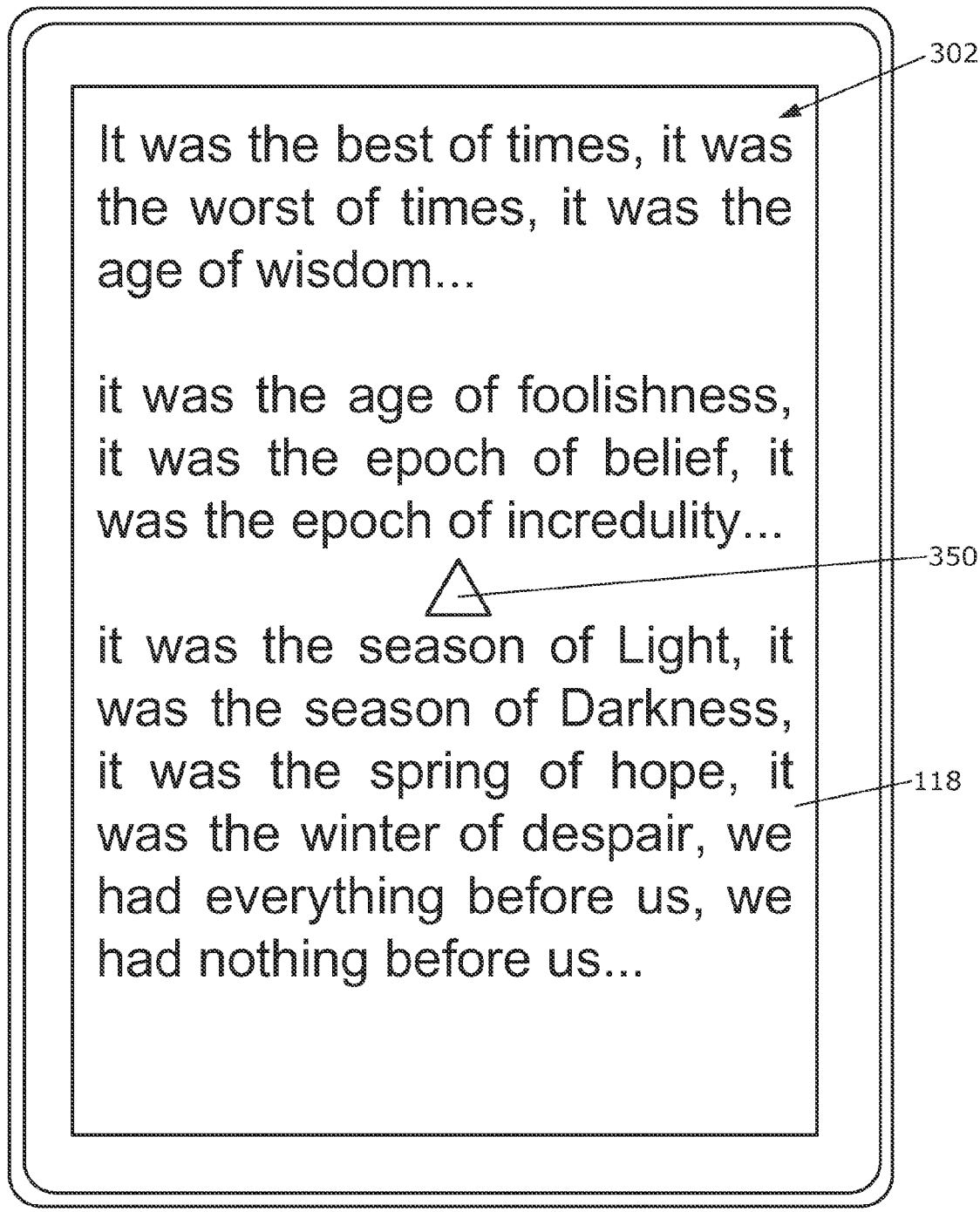
FIG. 3 through FIG. 8 are front views illustrating examples of display element selection on an electronic device in accordance with the method of FIG. 2.

One example of selecting display elements on an electronic device 100 is illustrated in FIG. 3 through FIG. 7 and described with continued reference to FIG. 2. In the front view of FIG. 3, a plurality of display elements 302 are displayed on touch-sensitive display 118 at 202. Although FIG. 3 illustrates display elements that include only text, as mentioned above, display elements can include other elements in addition to or instead of text.

Also illustrated in FIG. 3 is a selection tool 350, which is displayed at 206 in response to the detection of a gesture at 204. Selection tool 350 is illustrated as a triangle but in other embodiments takes other forms. In some embodiments, the selection tool is a geometrical shape, some examples of which are illustrated in FIG. 9.

Figure 4:
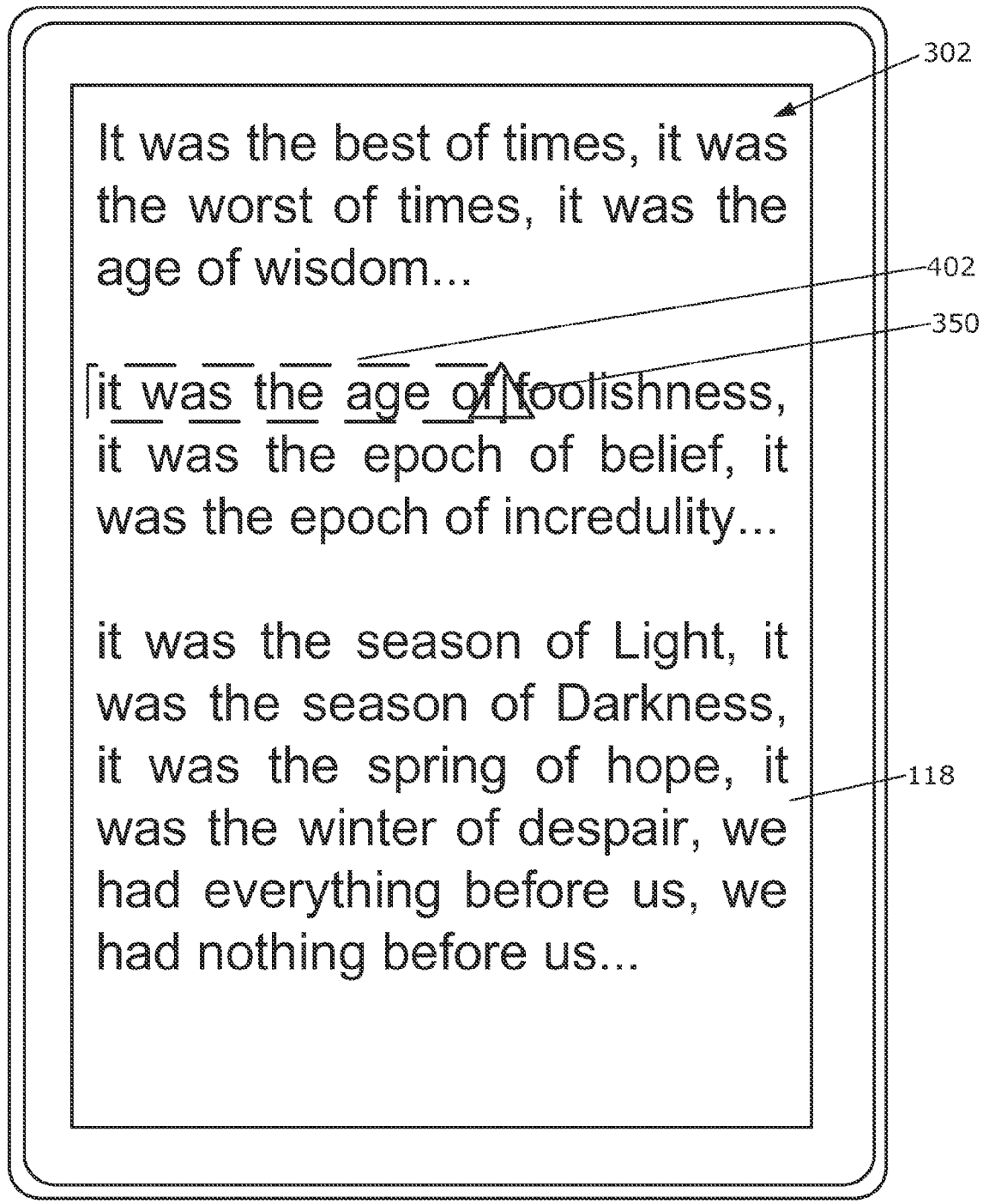

FIG. 4 illustrates a first portion 402 of display elements 302 that has been selected. The selection tool 350 is first moved, at 208, to the start of the portion 404 without selecting any display elements. In some embodiments, the selection tool 350 is moved without selection of display elements by touching and dragging a first portion of selection tool 350. In some embodiments, the first portion is one of the vertices of the triangle or the center of the triangle. In some embodiments, a different gesture than the touch, hold and drag is used, such as for example, but not limited to, a tap, hold and drag.

At 210, the first portion 402 of display elements 302 is selected by touching a second portion of the selection tool 350 and dragging it over the first portion 404 of display elements 302. In some embodiments, the second portion of the selection tool 350 is one of the vertices of the triangle or the center of the triangle. In other embodiments, in order select display elements, the selection tool 350 is dragged over or under the line on which the display elements appear. For example, a vertex of the selection tool can point to the text that is being selected as the tool is moved in relation to the portion of display elements that is being selected. In general, any suitable movement of a selection tool with respect to display elements can be used to select the display elements.

Figure 5:
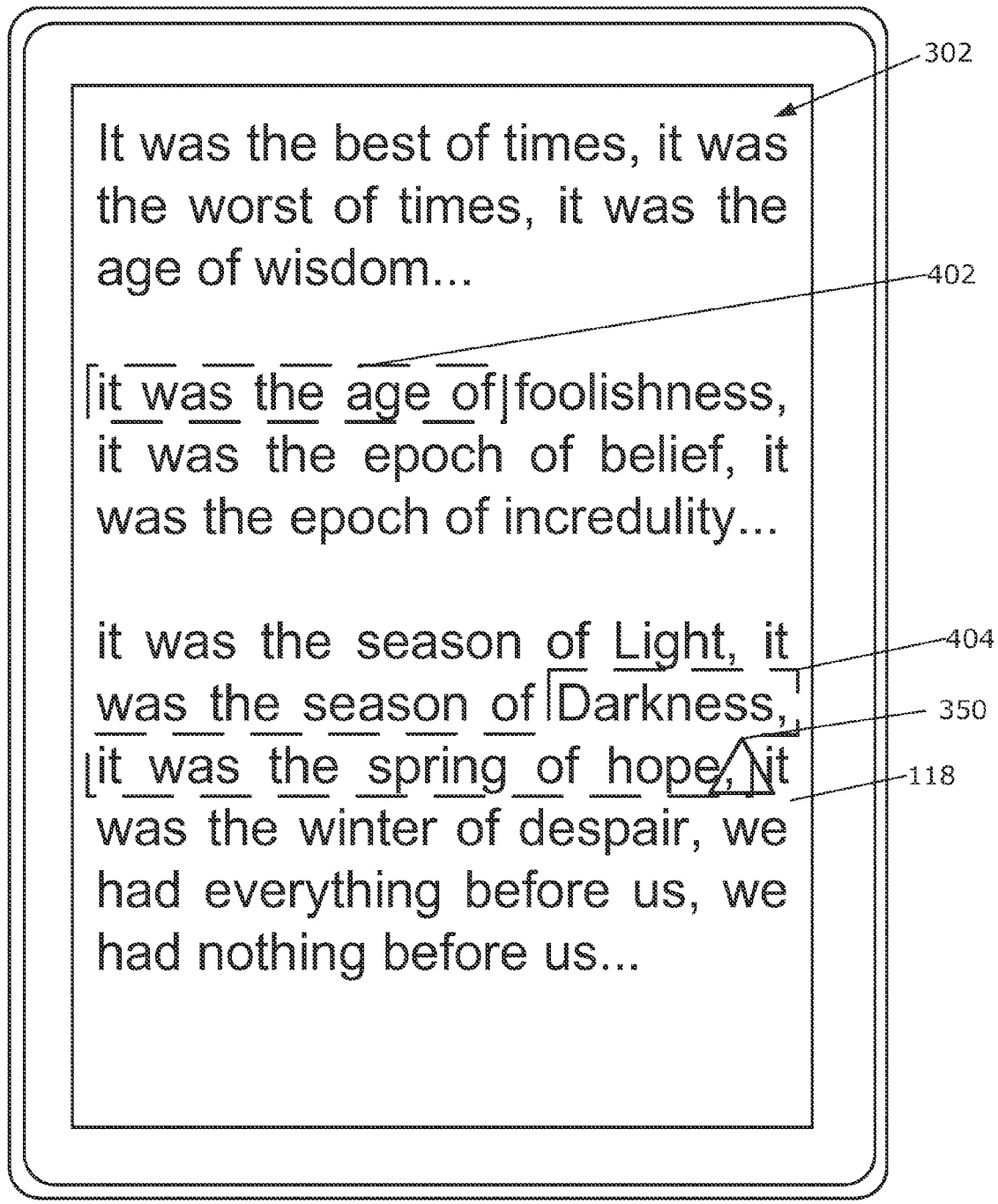

FIG. 5 illustrates the first selected portion 402 of display elements 302 as well as a second selected portion 404 of display elements 302. Second portion 404 of display elements 302 is selected in a similar manner to that described above in relation to FIGS. 2 to 4. As can be seen in FIG. 5, the method of FIG. 2 allows for non-contiguous portions 402 and 404 of display elements to be selected.

Figure 6:
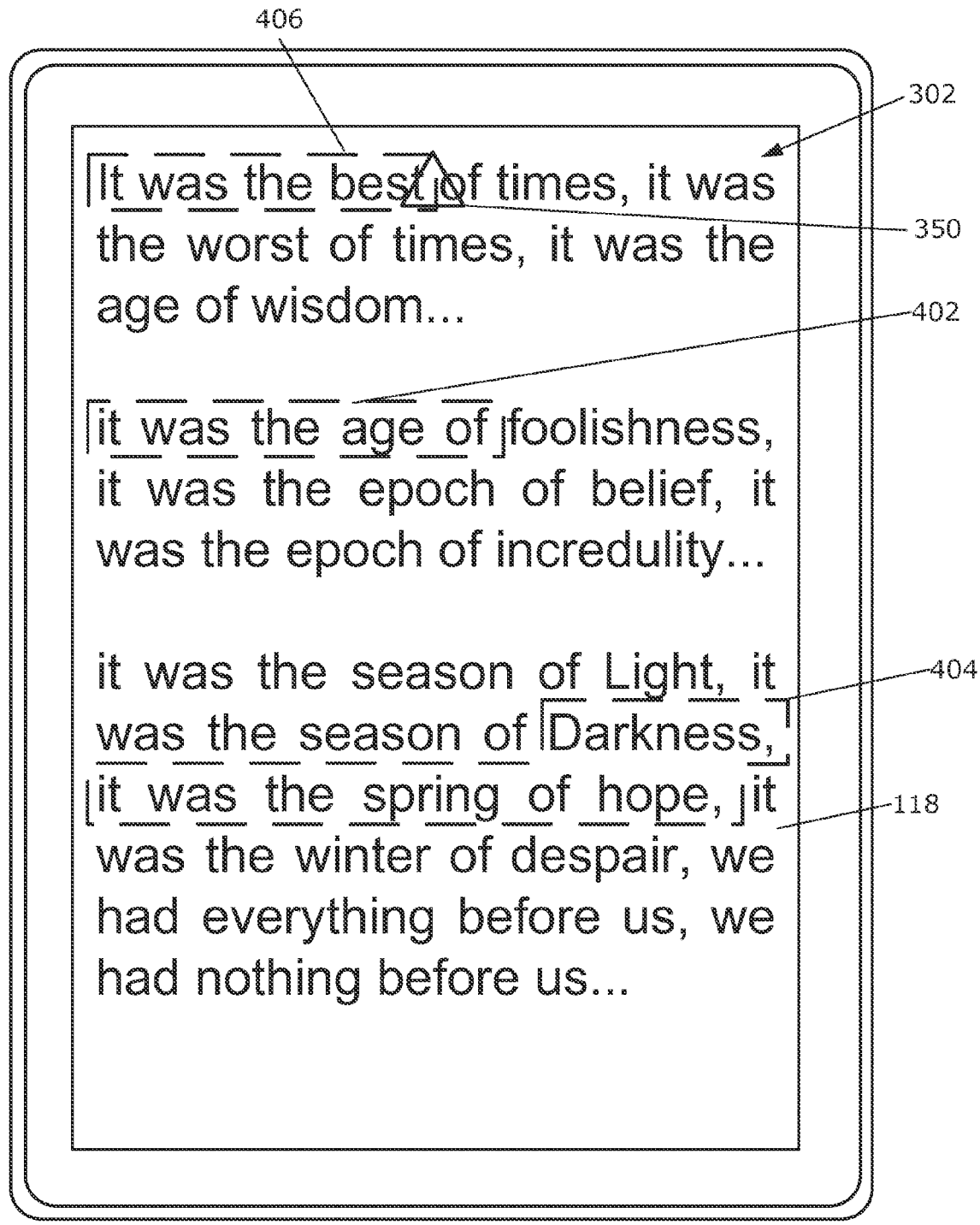

FIG. 6 illustrates a third portion 406 of display elements 302 that is selected in a similar manner to that described above in relation to FIGS. 2, 4 and 5. Although, portion 406 was the last portion selected chronologically, portion 406 appears above portion 402 and portion 404. Each of portions 402, 404, and 406 are shown as non-contiguous however, contiguous portions can also be selected. For example, after selecting portion 406, the user can further select the display elements "of times," to create the contiguous string of characters "It was the best of times,". In some embodiments, such a string of characters is treated as a single selected portion. In other embodiments, such a string of characters is treated as two separate selected portions, where the one portion is "It was the best" corresponding to portion 406 and the other portion is "of times,".

After a selection is made the user can perform an operation on the selected display elements by entering a command at 212. In some embodiments, the command is entered by applying a gesture to a portion of the selection tool.

Figure 7:
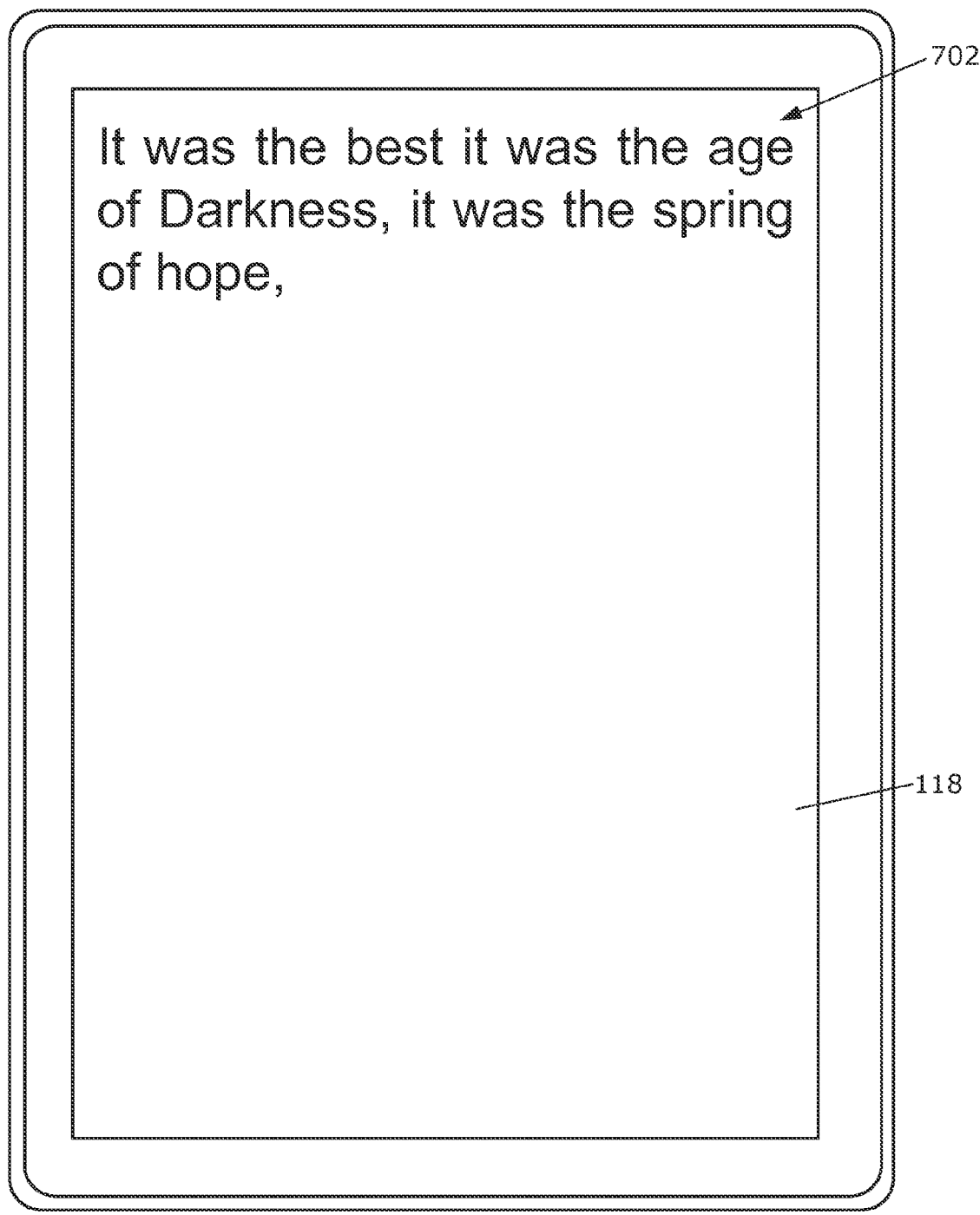
Figure 8:
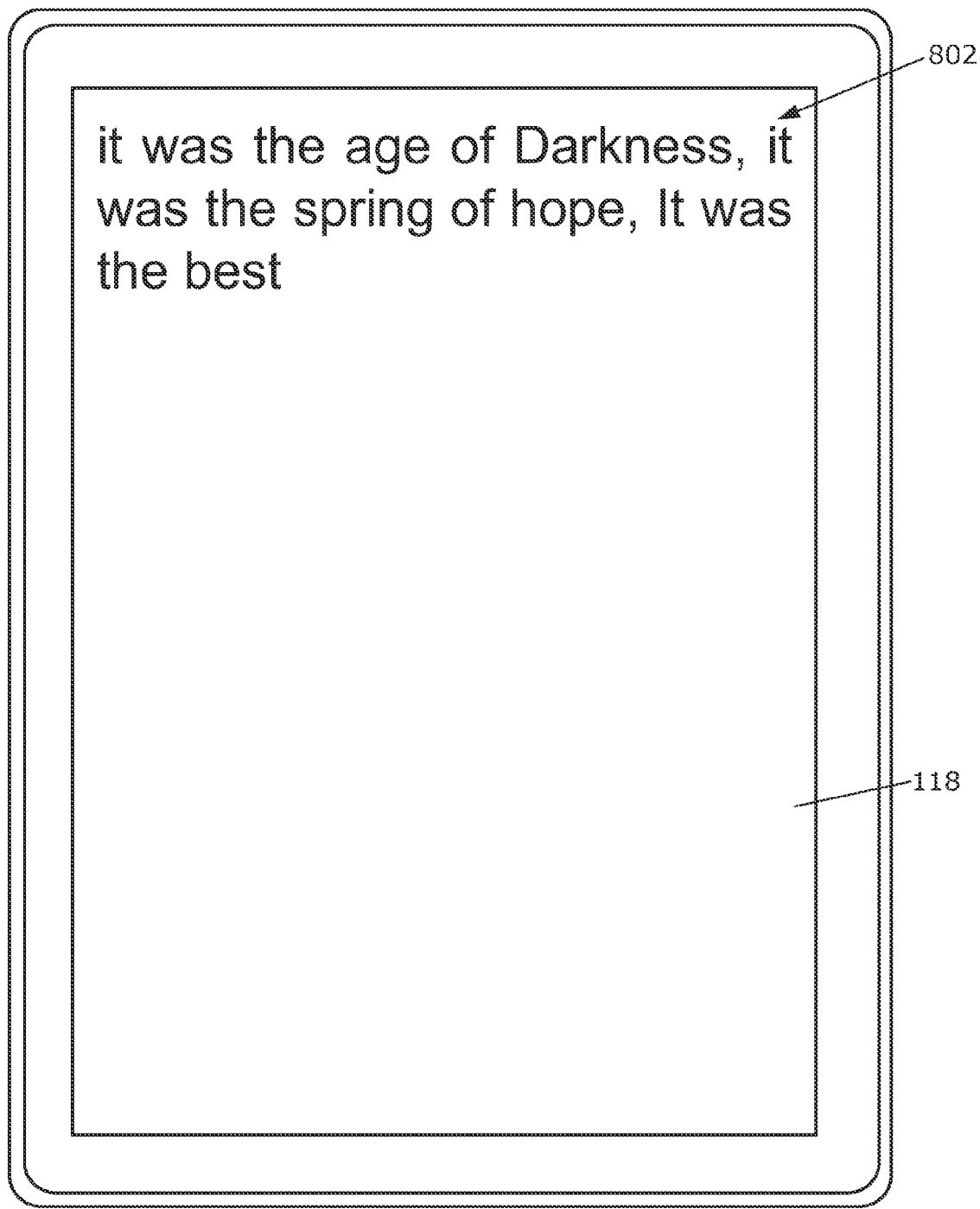

FIG. 7 illustrates a new document in which the display elements that were selected in FIG. 6 are pasted. In some embodiments, as illustrated in FIG. 7, the display elements are pasted in the order in which they appear in the document from which they are selected or the order in which they appear on the display. For example, in FIG. 7, the portions are illustrated as being pasted in the order of 406, 402, and 404, which is the order in which these portions are shown displayed on display 118 of FIG. 6. In other embodiments, as illustrated in FIG. 8, the display elements are pasted in the order in which they are selected. For example, in FIG. 8, the display elements are illustrated as being pasted in the order of 402, 404, and 406, which is the order in which they are selected in the example of FIGS. 4 to 6. Although, FIG. 7 and FIG. 8 illustrate the text as being pasted in a different document or application, pasting can occur in the same document or application.

As can be seen from the above discussion, some embodiments described herein allow a user to fully concentrate on a document or application as he or she selects display elements from the document or application. The user can select non-contiguous portions of display elements. In some embodiments, the process of selecting text is similar to the user highlighting portions of text with a highlighter on a physical paper copy. The user is allowed to fully concentrate on the document or application without being distracted by having to individually copy and paste individual portions of display elements.

Reference is now made to FIG. 9, which illustrates examples of selection tools 350, 920, 930, 940, 950, 960, 970, 980, and 990, according to various embodiments. In some embodiments, the selection tool can be any suitable geometric shape. In various embodiments, different portions of the selection tool can be used for different commands. The term portion can refer to, but is not limited to, a vertex, edge, corner, rounded corner, center, or inner portion of a shape. For example, in the case of selection tool 950, one or more of the outer vertices (i.e. the points of the star), such as 952, can be assigned to a command. Similarly, one or more of the inner vertices such as 954 can be assigned a command. Similarly, an inner area such as the center of selection tool 950 can be assigned a command. In the case of selection tool 940, different portions of the circumference, for example, but not limited to the top, bottom, left, or right, as well as the center of the circle can be used to input commands. Analogous use can be made of selection tool 960.

In some embodiments, the same portion of a selection tool can be used for a plurality of different commands by utilizing different gestures. For example, in some embodiments holding a dragging the center of a selection tool can be used to select display elements; while double tapping can be used to paste display elements that have already been selected and copied.

An example of command assignments for selection tool 350 is as follows. Selecting Elements: Holding down and dragging the center of selection tool 350 allows for selecting display elements. Moving the Selection Tool without Selecting Elements: Holding down and dragging the top vertex of selection tool 350 allows for selection tool 350 to be moved without selecting display elements. This vertex can be referred to as the "move vertex". This allows the selection tool to be repositioned so that additional non-contiguous display elements can be selected. In other embodiments, the move vertex is taped to enter or exit a movement mode. When in the movement mode, the selection tool can be dragged by any portion without selecting display elements and when not in the movement mode, dragging the selection tool causes selection of the display elements. Cancelling Selection: Taping the left vertex cancels a selection of display elements. This vertex can be referred to as the cancel vertex. In some embodiments, taping the cancel vertex cancels the most recent selection of display elements. If more than one set of selections has been made, then additional taps will cancel additional selections in reverse order of selection (i.e. most recent selections cancelled first). In other embodiments, taping the cancel vertex cancels all of the selections. Pasting: Taping on the center of the display tool pastes the current selection at the current position of the selection tool. Copying: As mentioned above, in some embodiments, any selected text is automatically copied. In other embodiments, a copy command is entered. For example, taping the right vertex can be used to copy the current selection. Displaying and Hiding the Selection Tool: A bezel swipe displays the selection tool when selection tool is hidden and hides the tool when selection tool is displayed. In various embodiments, the selection tool can be customized to detect a touch in an area around its edges that is different than the area of its visual representation on display 118. In some embodiments, the selection tool is configured to detect touches in an area that is larger than the area of its visual representation. In some embodiments, the selection tool is configured to detect touches in an area that is larger than and includes the area of its visual representation.

The above example of command assignments is an example only and is not intended to be limiting. Different portions of selection tool 350 can be assigned to different commands. In addition, different gestures may be used to execute the commands.

It should be understood that the selection of display elements described above can be performed for a variety of reasons and that the selected display elements can be used in a variety of ways. For example, selected display elements can be cut, copied, pasted, saved (e.g. save a selected image or other file), forwarded (a selected display element, such as an image, can be forwarded to a social media site), used to populate fields (e.g. contact fields in a contact database), or used as part of a function or operation.

The method is not limited to the portable electronic device illustrated in the examples. The method may be applied utilizing other electronic devices. The method may also be applied to display elements displayed in any orientation. The examples illustrate a portrait orientation but other orientation such as the landscape orientations are also applicable.

A method includes displaying a plurality of display elements on a touch-sensitive display of an electronic device; displaying a selection tool on the touch-sensitive display; in response to detecting a first gesture, selecting a first portion of the plurality of display elements, the first portion comprising at least one display element; and in response to detecting a second gesture, moving the selection tool without selecting the display elements; and in response to detecting a third gesture, selecting a second portion of the plurality of the plurality of display elements, the second portion being non-contiguous with the first portion.

An electronic device includes a touch-sensitive display and at least one processor coupled to the touch-sensitive display and configured to: display a plurality of display elements on a touch-sensitive display of an electronic device; display a selection tool on the touch-sensitive display; in response to detecting a first gesture, select a first portion of the plurality of display elements, the first portion comprising at least one display element; and in response to detecting a second gesture, move the selection tool without selecting the display elements; and in response to detecting a third gesture, select a second portion of the plurality of the plurality of display elements, the second portion being non-contiguous with the first portion.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of selecting portions of text, the method comprising:
    displaying a text on a touch-sensitive display of an electronic device;
    displaying a selection tool on the touch-sensitive display;
    in response to detecting a first gesture applied to a first portion of the selection tool, selecting a first portion of text, the first portion of display elements comprising at least one text element; and
    in response to detecting a second gesture applied to a second portion of the selection tool, moving the selection tool without selecting additional text; and
    in response to detecting the first gesture applied to the first portion of the selection tool, selecting a second portion of text together with the first portion of text, the second portion of text being non-contiguous with the first portion of text.

2. The method of claim 1, further comprising:
    copying the selected portions of text; and
    in response to a fourth gesture, pasting the selected portions of text.

3. The method of claim 2, wherein the selected portions of text are pasted in an order of appearance.

4. The method of claim 2, wherein the selected portions of text are pasted in an order of selection.

5. The method of claim 1, further comprising in response to a fifth gesture, cancelling a most recently selected portion of text.

6. The method of claim 1, wherein the selection tool comprises a geometric shape.

7. The method of claim 1, wherein the first gesture comprises touching and dragging a first portion of the selection tool.

8. The method of claim 1, wherein the second gesture comprises touching and dragging a second portion of the selection tool.

9. The method of claim 8, wherein the second portion of the selection tool comprises a first vertex of the selection tool.

10. A non-transitory computer-readable storage medium having computer-readable code executable by a processor of an electronic device to perform the method of claim 1.

11. The method of claim 1, wherein the first gesture comprises tapping the first portion of the selection tool, and wherein the second gesture comprises tapping the second portion of the selection tool.

12. An electronic device comprising:
    a touch-sensitive display; and
    at least one processor coupled to the touch-sensitive display and configured to:
        display a text on a touch-sensitive display of an electronic device;
        display a selection tool on the touch-sensitive display;
        in response to detecting a first gesture applied to a first portion of the selection tool, select a first portion of text, the first portion of display elements comprising at least one text element; and
        in response to detecting a second gesture applied to a second portion of the selection tool, move the selection tool without selecting the text; and
        in response to detecting the first gesture applied to the first portion of the selection tool, select a second portion of text together with the first portion of text, the second portion of text being non-contiguous with the first portion of text.

13. The electronic device of claim 12, wherein the processor is further configured to:
    copy the selected portions of text; and
    in response to a fourth gesture, paste the selected portions of text.

14. The electronic device of claim 13, wherein the selected portions of text are pasted in an order of appearance.

15. The electronic device of claim 13, wherein the selected portions of text are pasted in an order of selection.

16. The electronic device of claim 12, wherein the processor is further configured to in response to a fifth gesture, cancel a most recently selected portion of text.

17. The electronic device of claim 12, wherein the selection tool comprises a geometric shape.

18. The electronic device of claim 12, wherein the first gesture comprises touching and dragging a first portion of the selection tool.

19. The electronic device of claim 12, wherein the second gesture comprises touching and dragging a second portion of the selection tool.

20. The electronic device of claim 19, wherein the second portion of the selection tool comprises a first vertex of the selection tool.

\* \* \* \* \*